United States Patent
Calugaru et al.

(10) Patent No.: US 11,921,565 B2
(45) Date of Patent: Mar. 5, 2024

(54) LOAD ADJUSTED POPULATIONS OF INTEGRATED CIRCUIT DECOUPLING CAPACITORS

(71) Applicant: Microsoft Technology Licensing, LLC, Redmond, WA (US)

(72) Inventors: Vlad Radu Calugaru, Lake Stevens, WA (US); William Paul Hovis, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 56 days.

(21) Appl. No.: 17/530,148

(22) Filed: Nov. 18, 2021

(65) Prior Publication Data
US 2023/0152878 A1    May 18, 2023

(51) Int. Cl.
G06F 30/337    (2020.01)
G05F 1/46    (2006.01)
G06F 1/3296    (2019.01)

(52) U.S. Cl.
CPC .............. *G06F 1/3296* (2013.01); *G05F 1/46* (2013.01); *G06F 30/337* (2020.01)

(58) Field of Classification Search
USPC ........................................................ 716/137
See application file for complete search history.

(56) References Cited

U.S. PATENT DOCUMENTS

| | | | |
|---|---|---|---|
| 7,199,577 B1 * | 4/2007 | Rahnavard | H05K 3/0005 324/763.01 |
| 2007/0236299 A1 * | 10/2007 | Chun | G01R 31/318378 331/78 |
| 2014/0009990 A1 | 1/2014 | Kapoor et al. | |
| 2016/0196196 A1 | 7/2016 | O'flynn | |

FOREIGN PATENT DOCUMENTS

WO    2020263413 A1    12/2020

OTHER PUBLICATIONS

"International Search Report and Written Opinion Issued in PCT Application No. PCT/US22/047964", dated Mar. 20, 2023, 18 Pages.
Rhode, et al., "Impedance Measurements for Power Delivery Networks", Retrieved From: https://www.rohde-schwarz.com/in/applications/impedance-measurements-for-power-delivery-networks-application-card_56279-693952.html, Aug. 1, 2021, 2 Pages.

* cited by examiner

Primary Examiner — Bryce M Aisaka

(57) ABSTRACT

Techniques and systems for enhanced adjustment of quantities and placement of decoupling capacitance on circuit boards for integrated circuits is provided herein. An example method includes iterating application of a load profile across different populations of decoupling capacitors on a circuit board for supply voltage domains of an integrated circuit device until a target transient performance is reached for the supply voltage domains. The load profile is applied onto electrical connections corresponding to the supply voltage domains for the integrated circuit device. The method also (Continued)

includes generating a capacitor population configuration for the circuit board based on a population of the decoupling capacitors that achieves the target transient performance.

19 Claims, 6 Drawing Sheets

LOAD ADJUSTED POPULATIONS OF INTEGRATED CIRCUIT DECOUPLING CAPACITORS

BACKGROUND

Integrated circuit devices, such as central processor devices, graphics processors, or system-on-a-chip (SoC) devices can be employed in computing systems. These integrated circuit devices can have one or more voltage domains which correspond to particular power distribution subdivisions within the integrated circuit device. The voltage domains are supplied by corresponding voltage regulator elements, typically positioned on an accompanying circuit board or motherboard in the case of computing systems. Operating frequencies and operating temperatures are significant design concerns for high performance integrated circuits. However, a major barrier to increasing integrated circuit operating frequency is transient response and stability of the voltage domains supplying various processing units that form the integrated circuit device. These processing units, among other on-die components, can have power demands that vary rapidly and across a large power consumption range. As these power demands change quickly over time, voltage levels can experience dips or spikes, potentially leading to operational failures of at least the processing units.

Many computing systems include decoupling capacitors or increase operating voltages to counter these variations in power demands. Increased voltage levels can unfortunately lead to increased power consumption and operating temperatures, as well as decreased lifetime for semiconductor components. Decoupling capacitors can be employed to reduce some transient effects related to these power demands, such as ripples, spikes, or dips. However, placement of decoupling capacitors can lead to other problems, and is limited in effectiveness because such placement can be relatively far away, electrically, from target circuitry. Thus, circuit boards that include decoupling capacitors are typically designed based upon worst-case manufacturer specifications for the associated integrated circuit devices.

OVERVIEW

Decoupling capacitors can be employed to reduce transient effects related to power demands on supply voltage domains for integrated circuits, such as ripples, spikes, or dips. The examples herein provide enhanced techniques for adjustment or optimization of the quantity and placement of decoupling capacitors, which can reduce a quantity from a manufacturer specified level of capacitance to suit the environment into which integrated circuits are deployed. This can advantageously lead to fewer capacitors employed in a design, lower environmental impact when using fewer parts in a design, and ease supply chain concerns over limited supplies of electronic components.

In one example implementation, a method includes iterating application of a load profile across different populations of decoupling capacitors on a circuit board for supply voltage domains of an integrated circuit device until a target transient performance is reached for the supply voltage domains. The load profile is applied onto electrical connections corresponding to the supply voltage domains for the integrated circuit device while the integrated circuit device is not populated onto the circuit board. The method also includes generating a capacitor population configuration for the circuit board based on a population of the decoupling capacitors that achieves the target transient performance.

Another example implementation includes an apparatus having one or more computer readable storage media and program instructions stored on the one or more computer readable storage media that, based on being executed by a processing system, direct the processing system perform various operations. These operations iterate application of a load profile across different populations of decoupling capacitors on a circuit board for supply voltage domains of an integrated circuit device until a target transient performance is reached for the supply voltage domains, where the load profile is applied onto electrical connections corresponding to the supply voltage domains for the integrated circuit device while the integrated circuit device is not populated onto the circuit board. These operations also generate a capacitor population configuration for the circuit board based on a population of the decoupling capacitors that achieves the target transient performance.

Yet another example implementation includes a control system. The control system can include a test interface and a test profiler. Across an iteratively reduced population of decoupling capacitors, the test interface is configured to instruct a text fixture to apply a load profile onto electrical connections of a circuit board corresponding to supply voltage domains for an integrated circuit device while the integrated circuit device is not populated onto the circuit board. The test profiler is configured to monitor transient performance of the supply voltage domains and determine when a target transient performance is reached for the supply voltage domains. The test profiler is also configured to generate a capacitor population configuration for the circuit board based on a population of the decoupling capacitors that achieves the target transient performance.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
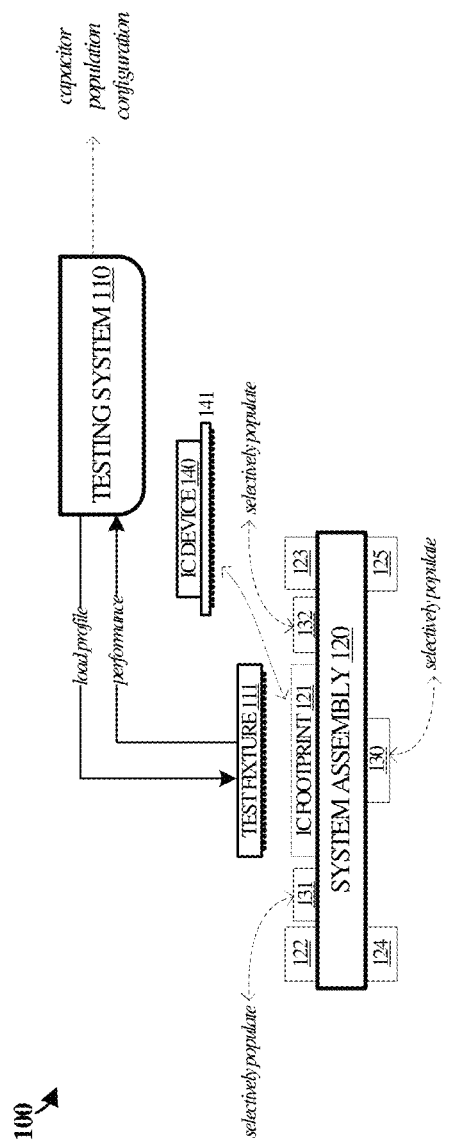
FIG. 1 illustrates a testing environment in an implementation.

Many computing systems employ high-performance integrated circuit devices, such as system-on-a-chip (SoC)

devices, central processing units (CPUs), or graphics processing units (GPUs), among other large-scale integrated circuit devices. These integrated circuit devices receive power provided by various power control and voltage regulator elements which alter a common input power to the system into individually-regulated domains, typically having lower output voltages than provided by the input power. The power supplied to an integrated circuit device is often subdivided among voltage regulators into domains or rails each supplying power at a particular voltage level to a particular electrically-segregated voltage domain or voltage domain within the integrated circuit device. Thus, GPU cores, CPU cores, input/output portions, security cores, or various data/control cores of an integrated circuit device might have individually-dedicated voltage domains supplied using individually-dedicated power delivery networks (PDNs). Thus, several instances of supply voltages can be received into an integrated circuit device by sets of electrically isolated external connections (e.g. pins, balls, or pads).

PDNs comprise the circuit routing, circuit board power planes, capacitive structures, and power delivery components like regulators, power FETs, diodes, or other such devices that form the electrical pathways extending from voltage regulators to the integrated circuit device, and can also include connections on a circuit board for the integrated circuit device, packaging/carrier pathways for the integrated circuit device, and power distribution elements within the semiconductor and metallization structures of the integrated circuit device itself to delivery power to active circuit components. Domains are employed to ensure ample current is supplied to portions of an integrated circuit, often requiring different operating voltages than other portions of an integrated circuit. However, as density and power requirements of integrated circuitry has increased, supplying stable power across various operating conditions can be challenging. For example, transient response and stability of voltage rails supplying portions of an integrated circuit can depend on the dynamic operation of the integrated circuit as well as the existence of parasitic inductive characteristics of the PDNs. One strategy is to deploy various tiers of decoupling capacitance to assist in transient response of voltage rails, such as to decrease the influence of high frequency transient events (spikes or dips) by providing localized pools of charge closer to the affected circuitry and shunting noise of certain frequencies to ground. The effectiveness of decoupling capacitors is related to the capacitance values of the capacitors as well as an area defined by physical paths that electrical current takes when traveling to individual decoupling capacitors. The area inside this path or loop translates to inductance, and this inductance limits the frequencies over which the capacitor can be effective for decoupling purposes.

Suppliers of integrated circuit devices, such as the original equipment manufacturers of such devices, often specify a certain target capacitance for the integrated circuit device power rail, for instance VDD, VDD_IO, VDD_MEM, and the like. However, each integrated circuit device is manufactured slightly differently and due to variability in semiconductor processing, and each voltage rail on each individual integrated circuit device will vary in power draw and parasitic elements. Thus, a non-uniform distribution of power delivery related needs is exhibited by integrated circuit devices. Decoupling capacitors are strategically placed near or under the integrated circuit device to help mitigate manufacturing variability among integrated circuit devices and to ensure that power delivery needs are met. Manufacturers typically specify a target capacitance for each voltage rail based on worst-case conditions and worst-case manufacturing variability. Circuit board designers and system assemblies use these target decoupling capacitances to determine placement and population of decoupling capacitors in corresponding designs without regard to manufacturing variability, and also use the worst case needs of the system to stabilize the power supply against short term and long term load variation. However, real-world integrated circuit devices will exhibit device-to-device manufacturing variability in both DC and AC current demand associated with the voltage domains. Even where simulation, characterization, or stress devices are used to validate the power stability or power delivery integrity of a design, decoupling capacitor optimization is not currently employed to determine what is actually required and preferred for the overall stability, manufacturability, cost, and sustainability of a system. Also, integrated circuit devices can be manufactured having different 'bins' or performance groupings, which can lead to differing performance requirements among the bins. Moreover, voltage minimization techniques can be employed for integrated circuit devices tested over various operational modes, which can lead to lower overall supply voltage levels and corresponding decoupling capacitance needs. The enhanced techniques and systems herein discuss improvements to placement and population of decoupling capacitors for integrated circuit devices, such as SoCs, CPUs, GPUs, and other similar devices. These techniques can lead to a tuned or more optimized power delivery network (PDN) for an integrated circuit device.

Decoupling capacitors come in various configurations. For example, decoupling capacitors can be positioned on a circuit board outside of a perimeter of an integrated circuit device, over/under a footprint of the integrated circuit device, or included on the semiconductor die of the integrated circuit device. Decoupling capacitors positioned on the circuit board outside of the perimeter of the integrated circuit device typically exhibit larger inductance than other positionings and cannot alleviate very fast transients on certain devices. Decoupling capacitors positioned over/under a footprint of the integrated circuit device can provide better transient response due to decreased inductive paths. Decoupling capacitors can be placed in a land-side configuration on carrier for a semiconductor die carrier, referred to as land-side capacitors (LSCs). These land-side capacitors are placed underneath a circuit board carrier or package that holds the die. Similarly, die-side carrier decoupling capacitors have been employed, referred to as die-side capacitors (DSCs). These are decoupling capacitors placed on a top side of a die carrier, typically around a perimeter adjacent to the semiconductor die. Capacitance elements can also be integrated into the same semiconductor die as the integrated device itself. Since capacitance is directly related to unit area, any addition of capacitive structures on the die results in more required die area. Thus, this technique leads to larger semiconductor dies and associated increased costs and is not frequently employed in non-specialized devices. Regardless of the type of decoupling capacitors employed outside of the semiconductor die, a circuit design often employs an unoptimized quantity of decoupling capacitors placed or populated for the affected circuitry.

Turning now to a first example implementation, FIG. 1 is presented. FIG. 1 illustrates testing environment 100. Environment 100 includes testing system 110 and system assembly 120. Testing system 110 includes test fixture 111. System assembly 120 includes one or more circuit boards having integrated circuit device footprint 121, voltage regulators 122-125, and three representative banks of decoupling capacitors 130-132. When employed in computing systems, system assembly 120 might comprise a motherboard and corresponding elements. Integrated circuit device 140 can be coupled onto system assembly 120 at footprint 121. Footprint 121 can thus comprise various electrical coupling or contact features for assembling integrated circuit device 140 to system assembly 120. Footprint 121 might include a socket or various solder features, such as solder balls or solder bumps, onto which corresponding features of integrated circuit device 140 can couple to system assembly 120. Testing system 110 is configured to test or exercise various features of system assembly 120, which may occur in a manufacturing setting or testbench setting.

Figure 2:
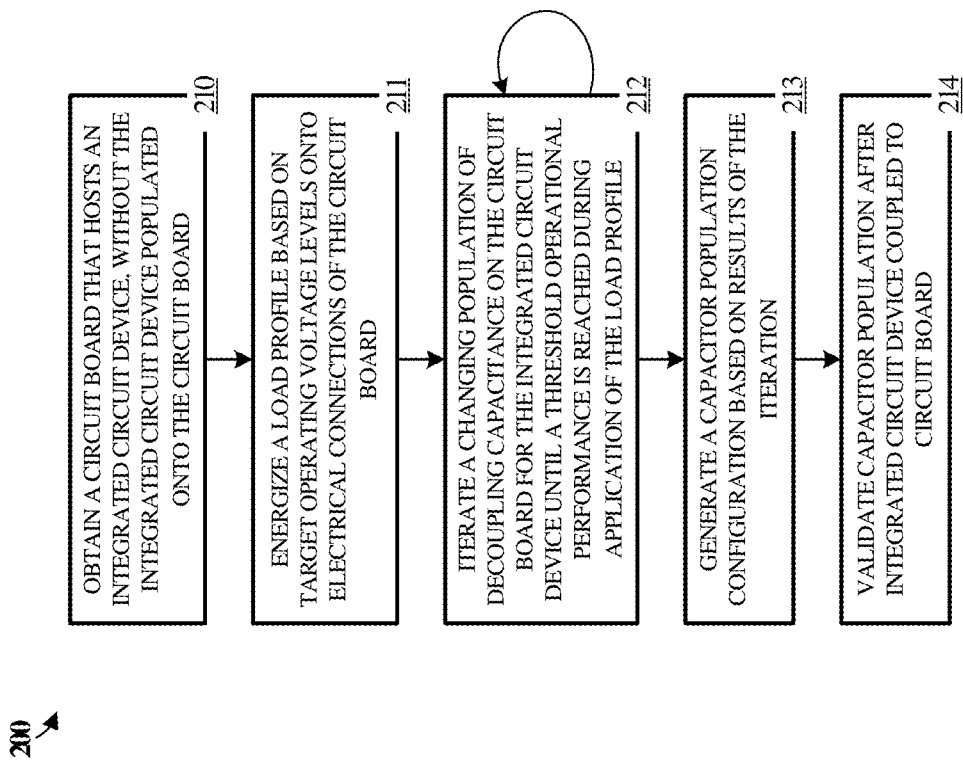
FIG. 2 illustrates a testing environment in an implementation.

FIG. 2 illustrates example operations 200 for the elements of FIG. 1. The operations of FIG. 2 can also apply to the additional implementations discussed herein. In operation 210, a circuit board is obtained that hosts an integrated circuit device, such as integrated circuit device 140, but without the integrated circuit device populated onto an associated circuit board of system assembly 120. Contact elements of test fixture 111 can be removably applied to footprint 121 of system assembly 120. However, as mentioned, while test fixture 111 is applied to footprint 121 and during the corresponding testing operations, integrated circuit device 140 is not coupled to system assembly 120. Other elements of system assembly 120, such as voltage regulators 122-125, other integrated circuit devices, various support circuitry, logic, slots, connectors, passive components, and the like can be populated.

In operation 211, testing system 110 (via test fixture 111) energizes a load profile onto electrical connections of the circuit board. These electrical connections include those of footprint 121 corresponding to supply voltage connections or rails for integrated circuit device 140. Across various iterative loading profiles comprising simulated load conditions applied by test fixture 111, decoupling capacitors 130-132 are selectively installed or populated on system assembly 120 (operation 212) between supply voltage domains/rails and reference potentials (e.g. electrical ground) associated with footprint 121. Dynamic or "AC" performance is simulated by testing system 110 using a load slammer or similar elements to test the power rails and PDN elements of system assembly 120. A further discussion of the load profile is included below.

If results from the application of the load profile show margin in the targeted properties for the power rails and PDN elements, a present quantity of decoupling capacitors is altered, and the load profile is repeated on a new quantity of capacitors. Removal of decoupling capacitors can entail removal of ones of the decoupling capacitors furthest electrically from footprint 121, while addition of decoupling capacitors can entail addition of ones of the decoupling capacitors closest electrically to footprint 121. This can ensure that decoupling capacitors having a greater inductive influence on an associated voltage rail with regard to footprint 121 and integrated circuit device 140 are removed in the iterative process before capacitors having a lesser inductive influence. Various iterative removal or addition of decoupling capacitance can be employed, depending on the initial quantity of decoupling capacitance. For example, an initial condition can include having an initial population of decoupling capacitors, and changes to the population made under similar load profiles applied by test fixture 111. One initial population can include the maximum quantity of decoupling capacitors, with a ramping down in quantity over each iteration of applied load profiles. Another initial population can include the minimum or zero quantity of decoupling capacitors, with a ramping up in quantity over each iteration of applied load profiles. Capacitors can be added until a threshold performance is reached or results are not altered above a target threshold. Yet another example initial population is to start with an intermediate amount of decoupling capacitance and then either more can be added or taken away to fill out an appropriate number of characterization points which are then used to make the final capacitance requirement determination.

The load profile applied by testing system 110 can include both $\Delta i/\Delta t$ events (AC) and steady-state loading conditions (DC) applied to voltage rails via corresponding connections of footprint 121. The load profile can be defined by waveforms or electrical current loading definitions that define a frequency of load events and duty cycle of the loading events and waveforms. Various $\Delta i/\Delta t$ events can be produced using a load generation device, which can comprise a load slammer or similar element, that produces variable resistive loads or loads simulating transistor devices switching at a particular frequency or set of frequencies. The load profile can incorporate various inductive or capacitive loading to simulate metallization or interconnect of the integrated circuit device along with capacitive properties of the transistors themselves. Load currents applied to the connections of footprint 121 can encompass electrical design current (EDC) levels and thermal design current (TDC) levels. Load profiles can further encompass transient loads to induce spikes, dips or other transient events on power rails. Loads can be selectively applied or altered in magnitude to simulate dynamic loads, noise signals, or composite load signals simulating operation of integrated circuit device 140. Load profiles can be configured to simulate coupling of noise from data/control/clock signals onto power rails.

In addition to electrical current loading profiles, environmental conditions can be simulated, such as ambient temperature for the decoupling capacitors and other components of system assembly 120. Temperature impacts can be relevant to decoupling capacitor performance, as some capacitor placement requires higher temperature components, especially decoupling capacitors which are nearest to the component under test (e.g. SoCs, CPUs, GPUs) that consume a lot of power and often generate areas of high heat. Although generally, the removal of devices farthest away from the component under test is suggested above, other constraints, such as manufacturing supply of components, may prefer farther capacitors over closer and more restrictive high-temperature tolerant capacitors.

Performance characteristics of the PDNs and voltage regulators 122-125 providing the voltage domains or voltage rails can be monitored by testing system 110 while applying the load profile for each of the population iterations. For example, testing system 110 monitors AC noise, transient responses, voltage swings, magnitudes of dips or spikes, and other characteristics. Monitoring of the voltage domains or rails can also be accomplished with various probes attached to probe points on the voltage rails directly in system assembly 120 and measured by any number of test equipment devices (e.g. oscilloscopes, digital oscilloscopes, multimeters, etc.). Performance characteristics can be captured and compared to target specifications or target threshold levels, such as minimum/maximum voltage swings for each voltage domain or rail. Testing can complete when targets are reached or when changes to quantities of decoupling capacitors, such as adding more capacitance, does not improve performance. As an example, if the specified voltage swing for a particular voltage rail is 1 V+/−100 mV, a first iteration produced +/−50 mV in voltage variation during the load profile, then a set of capacitors were removed and produced +/−75 mV in voltage variation during a retesting using the load profile, then further capacitors can be removed until the measurements show +/−90 mV. Guardbands can be applied, such as 10%, to the targets. A 10% maximum of the rail specification can be modified based on the criteria for end-of-life guardbands (EOL), aging, temperature and other reliability factors such that integrated circuit devices will not "brown out" after aging or exposure to varying environmental conditions. It should also be understood that any aging impacts (i.e. reduction in capacitance as a result of stress over time) also can be taken into account when making a final determination about how much capacitance is required. So if a 20% reduction is calculated to be the worst amount of reduction at the EOL operation, than 20% additional capacitance should be populated.

As mentioned above, each supply voltage rail or domain will have an associated characteristic voltage associated therewith. Target operating voltage levels supplied by voltage regulators 122-125 can be selected for each supply domain according to a nominal voltage level specified by a manufacturer of the integrated circuit device or instead according to voltage levels reduced below a nominal voltage level. Load profiles thus might employ voltage levels at manufacturer-specified levels or even at higher levels to determine worst case performance for decoupling capacitors. A quantity of capacitance needed can be even further reduced by using voltage regulators 122-125 adjusted to a lower voltage level than manufacturer-specified levels. For example, a voltage reduction discovery algorithm can be employed to determine supply voltage levels for the integrated circuit device down to lower or minimum values required for operation. This also helps to reduce the amount of power supply capacitance which is required on systems that employ a voltage reduction algorithm. When combined with the iterative decoupling capacitance techniques outlined herein, even more component savings are possible, such as reduced quantity of capacitors, reduced quantity of vias, potentially reduced circuit board area, and lower corresponding environmental impacts by having fewer components and/or smaller board sizes.

Also, integrated circuit device 140 may be selected from among groups or bins of integrated circuit devices. Different load profiles can be applied to differentiate performance among integrated circuit device bins. It can be further provided that since integrated circuit device can be binned into various categories (i.e. those that are inherently faster, those with moderate speed, those that are slower, etc.), that different capacitive requirements can be determined for different bins of devices. A fast integrated circuit device may need less or substantially less capacitive decoupling as it generally operates with lower AC power and has higher DC power (which further helps to stabilize the supply voltage level and reduce the AC noise). While slower integrated circuit devices may require additional amounts of capacitance, the binned approach allows integrated circuit devices that need less capacitance to be manufactured on circuit boards having even fewer capacitors as opposed to a one size fits all approach, which can result in a net savings of capacitor components overall.

Once a threshold performance or performance target is reached under the load profile for a present quantity of decoupling capacitors, this present quantity of decoupling capacitors can be used to set a final population of decoupling capacitors for system assembly 120. The final population might be altered from a raw value of the present quantity to include provisioning for any guardbands, end-of-life, or margin, if desired. A resultant capacitor population configuration indicates the final population of decoupling capacitors, and can be generated by testing system 110 for transfer to external destination nodes (operation 213). These nodes can include systems responsible for assembling bills-of-materials for system assembly 120, computer-aided schematic or circuit design tools which alter a schematic or circuit, user interface systems which indicate the associated decoupling capacitors in a table according to component identity/number or graphically overlaid on a circuit or schematic representation of system assembly 120, or to other destinations including storage media for later retrieval. This capacitor population configuration is then applied in a manufacturing setting by altering a bill-of-materials for system assembly 120 to only populate ones of the decoupling capacitors identified in the capacitor population configuration.

In operation 214, a circuit assembly including the final set of decoupling capacitors indicated by the capacitor population configuration and a now-populated integrated circuit device can then be tested to verify or validate the results of the iterative testing. Integrated circuit device 140, in the context of various peripheral, storage, and memory devices, can be configured to boot into an operating system (OS) once provided with one or more supply voltages to execute various operations including user applications, communication services, storage services, gaming services, or other features of a computing system. Real-life loading can be applied using software elements which exercise the integrated circuit device under various conditions. In computing system examples, various software applications, games, videos, power virus applications, and other stress applications can be executed by the integrated circuit device with the final set of decoupling capacitors populated. Testing system 110 can measure the voltage behavior and noise characteristics under these "real-life" stresses and ensure that the target specification for each voltage domain is not violated under the capacitor population configuration. In addition, environmental conditions can be simulated, such as ambient temperature during such validation testing. Advantageously, once such a capacitor population configuration has been performed and validated, subsequent system assemblies manufactured will typically perform as good as or better than the system configuration used to determine the capacitor population configuration. Also, in addition to reduction in bills-of-materials (e.g. component counts), a circuit board might be entirely modified to only support the quantity of capacitors indicated by the capacitor population configuration. This can result in further material reduction with potentially smaller circuit boards, fewer circuit vias used to enable decoupling capacitor connections, and other effects.

In another example implementations, iterative optimization can be performed with a populated integrated circuit device 140 instead of employing test fixture 111 applied to footprint 121. In such examples, integrated circuit device 140 can be operated using a suite of operations that stress the voltage rails. Under these operations, performance of the voltage rails can be monitored using various probes or monitoring devices to determine if the target performance is reached, such as target AC voltage performance on the voltage rails. Capacitor populations can be altered or changed to increase or decrease the voltage swings on the voltage rails and find a reduced set of capacitors from a manufacturer or design point. In implementations where integrated circuit device 140 is populated, performance may be monitored by techniques where the operational margins are determined by testing to fail points (i.e. points where the system fails, hangs, times out, or otherwise ceases to operate correctly). In such a fashion, the impact on the operational voltage or noise on the voltage domain is determined indirectly. One such operation impact can be where the necessary voltage to operate integrated circuit device 140 without failure begins to increase appreciably when the population of capacitors for a particular supply voltage was reduced by a particular amount.

Returning to a discussion on the elements of FIG. 1, system assembly 120 comprises circuit boards housing various circuitry and associated power systems which can include voltage regulators 122-125. Various contextual or peripheral elements can be included in system assembly 120, such as mounted to a corresponding motherboard or included on separate circuit boards. These elements can include a south bridge, north bridge, peripheral hubs, audio circuitry, data storage interfaces, data storage devices, graphics processors, display interfaces, random-access memory (RAM), network interfaces, and various communication interface circuitry. Furthermore, input power conditioning circuitry and optional thermal management elements can be included. System assembly 120 can be designed having footprint 121 for integrated circuit device 140, power distribution elements to supply power to the various voltage domains of integrated circuit device 140, and capacitor placement features and vias to connect between power rails and reference potentials, among other various system elements and features, to form a motherboard or specialized circuit board for integrated circuit device 140.

Decoupling capacitors 130-132 for integrated circuit device 140 can be included on a circuit board comprising system assembly 120. Decoupling capacitors 130-132 can comprise surface mount, multilayer ceramic capacitors (MLCCs), through-hole, or other types of capacitors. Decoupling capacitors 130-132 can be of various sizes, such as 0603, 0402, 0201 size surface mount capacitors, among others. Various banks or groups of decoupling capacitors can be employed, such as three shown in FIG. 1. These banks can have various quantities of individual capacitors as well as associated locations on system assembly 120, each with a corresponding path length and corresponding path-dependent inductance. The positioning of the banks typically is fixed during a design phase for system assembly 120, which are defined by solder pads and traces formed onto associated circuit boards. Thus, during manufacturing, the population of decoupling capacitors is often fixed for a given design of system assembly 120.

Integrated circuit device 140 comprises a system-on-a-chip (SoC), microprocessor, central processing unit (CPU), graphics processing unit (GPU), application-specific integrated circuit (ASIC), field-programmable gate array (FPGA) tensor processing unit (TPU), or baseband processing unit (BBU), among other analog and digital integrated circuits. Integrated circuit device 140 is formed using various semiconductor manufacturing processes, such as employed in semiconductor wafer fabrication. Integrated circuit device 140 includes various layers, logic devices, interconnect, metallization, processing cores, and interfacing circuitry. Integrated circuit device 140 comprises one or more voltage domains, each corresponding to a characteristic nominal voltage level. Integrated circuit device 140 can comprise a flip-chip die design which has external pads on a top side of chip (with regard to a manufacturing directionality), and is coupled to package assembly 141 via solder features, controlled collapse chip connection (C4) balls, or other bonding processes. Typically, a portion of the external interconnect of integrated circuit device 140 is dedicated to control, data, and clock connections, while another portion of the external interconnect of integrated circuit device 140 couples to power/voltage domain interconnect/planes or power distribution features formed into integrated circuit device 140.

While not required, a chip/die carrier or package assembly (shown as element 141 in FIG. 1) can be employed for integrated circuit device 140. This package assembly 141 comprises a circuit board, smaller than that of system assembly 120. Package assembly 141 can comprise similar materials as system assembly 120, such as layers of insulating and printed/etched conductive materials with associated traces, planes, routing, vias, and the like. Package assembly 141 then would couple to system assembly 120 via one or more solder bumps or solder features, such as C4 balls. In other examples, pins and sockets are employed for package assembly 141. Package assembly 141 can comprise a flip-chip assembly when fitted with an associate die of an integrated circuit device, such as integrated circuit device 140. Package assembly 141 has a first surface or side (referred to as a die side) which couples to integrated circuit device 140 and a second surface or side (referred to as a land side) which couples to a circuit board of system assembly 120 via solder features.

Voltage regulators 122-125 can be a part of a larger power system of system assembly 120. Elements of the power system might be replicated a number of times to provide several voltages for integrated circuit device 140. The power system receives power from an external source over an input power link, such as from batteries or an external power source, and converts/regulates the power to produce voltages and currents to operate the elements of system assembly 120. Voltage regulators 122-125 can comprise voltage conversion circuitry, such as regulators, AC-DC converters, DC-DC converters, power electronics elements, power filtering elements, power conditioning elements, and other similar circuitry.

Although not shown in FIG. 1 for clarity, a power controller can be communicatively coupled to voltage regulators 122-125. Elements of such a power controller can comprise one or more microprocessors and other processing circuitry that retrieves and executes software or firmware, such as power regulator control firmware, from an associated storage system. Examples of a power controller include a processing core, such as a hardware security module (HSM), hardware security processor (HSP), security processor (SP), trusted zone processor, trusted platform module processor, or management engine processor. Other examples of a power controller include one or more microcontrollers, microprocessors, field programmable gate array (FPGA) devices, application specific integrated circuit (ASIC) devices, application specific processors, or other processing elements. In operation, a power controller can control voltage levels provided by voltage regulators 122-125 to one or more voltage domains of integrated circuit device 140. This power controller can monitor temperatures or other thermal properties of system assembly 120.

Testing system 110 comprises a testing control system including a processing system that stores and retrieves load profiles to control test fixture 111. Testing system 110 monitors voltage domain performance under various load profiles and decoupling capacitance populations. Testing system 110 can include elements of test fixture 111 or be incorporated into test fixture 111. Testing system 110 includes one or more communication interfaces to report results to external nodes or entities. Testing system 110 typically has local data storage devices to store load profiles, monitoring instructions, and resultant capacitor population configurations. Monitoring of the performance of the voltage domains under test can be accomplished via included monitoring circuitry, such as operational amplifiers, comparators, or analog-to-digital conversion circuitry, portions of which may be included in test fixture 111. A digital representation of the monitored performance can be provided to testing system 110 when converted from an analog format into a digital format.

Test fixture 111 conductively couples to voltage domains via pads or balls on system assembly 120 via footprint 121. This conductively coupling can also include coupling to data, clock, control, or I/O connections if desired. Connection features can comprise pins or spring-loaded or compliant electrical contact features to conductively contact pads/balls of footprint 121 on system assembly 120. Various aiming or positioning elements can be included to properly align and make contact with footprint 121. Test fixture 111 includes various communication and power links to testing system 110, and can have local circuitry to simulate loads according to the load profiles or modulate loads according to the load profiles. Test fixture 111 may include heat dissipation elements or environmental simulation elements, such as housings, cabinets, or solid-state temperature regulation devices to increase or decrease an environmental condition or operating temperature of system assembly 120. Test fixture 111 may include digital-to-analog conversion circuitry to convert commands/load profiles received from testing system 110 in a digital representation into analog representation for application to footprint 121. Test fixture 111 may include analog-to-digital conversion circuitry to convert analog measurements of the performance of system assembly 120 into a digital format for transfer to testing system 110.

Figure 3:
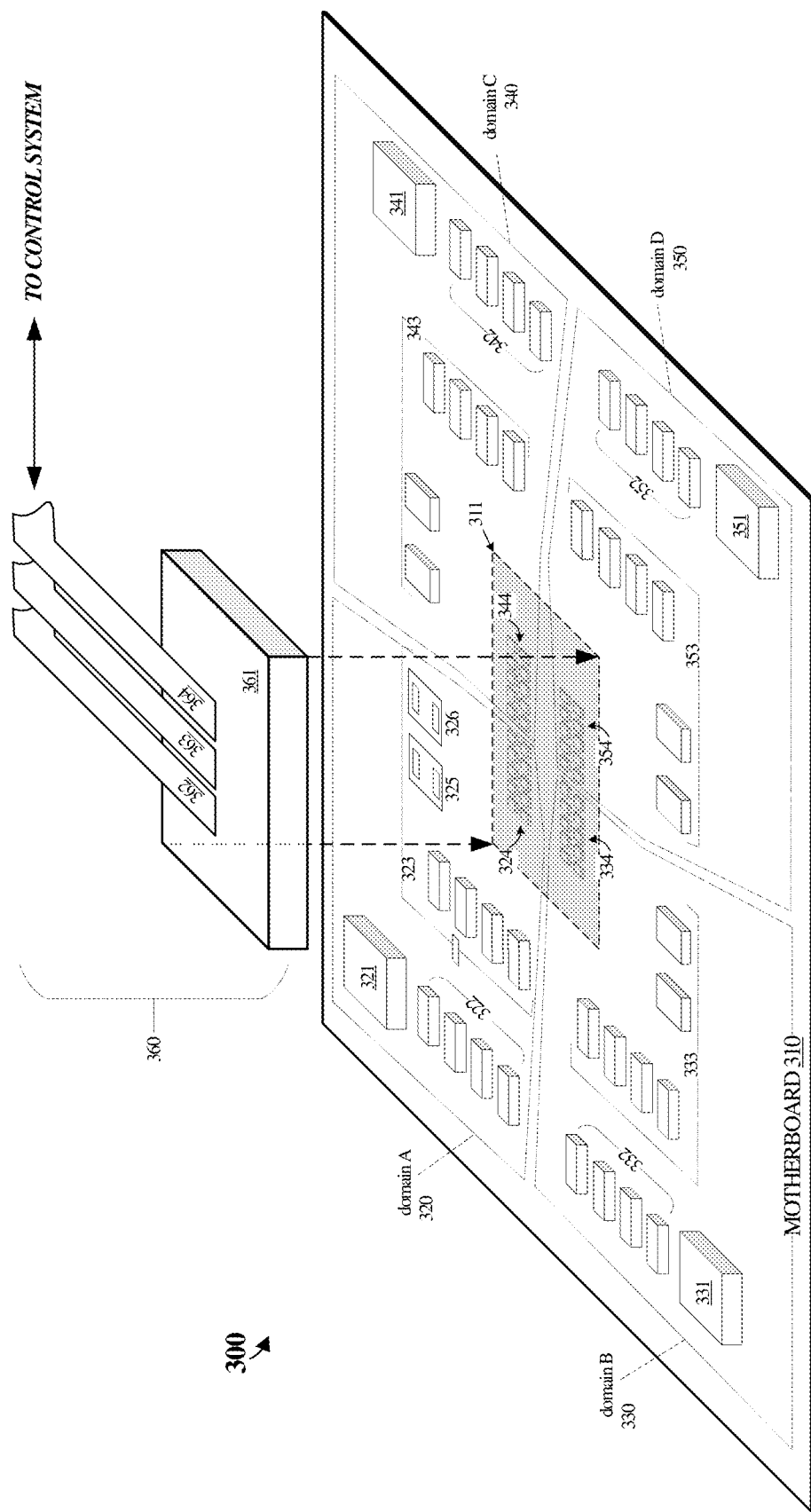
FIG. 3 illustrates example operations of a testing system in an implantation.

FIG. 3 illustrates testing environment 300. Testing environment 300 includes motherboard 310 and testing system 360. Motherboard 310 houses various components that form four voltage domains 320, 330, 340, and 350 that provide power to an integrated circuit device coupled to footprint 311. Footprint 311 can be included on a carrier or package assembly. An integrated circuit device (not shown in FIG. 3 for clarity) can be coupled to connection features of footprint 311, but for testing operations is omitted to allow test fixture 361 of testing system 360 to be applied to footprint 311. Motherboard 310 comprises one or more printed circuit boards and various electrical components which support operation of the integrated circuit, among other elements not shown, such as peripheral circuitry, other integrated circuit devices, communication interfaces, and thermal control elements. Motherboard 310 is shown as including voltage regulators 321, 331, 341, and 351, each corresponding to a different voltage domain on motherboard 310 and providing a particular voltage rail. Motherboard 310 also includes various banks or sets of decoupling capacitors, with the banks assigned to particular voltage domains as noted in FIG. 3. Each capacitor couples between the voltage rail of the voltage domain and an associated reference potential or common electrical ground.

Motherboard 310 can be a component within a computing system assembly, such as a computer, server, blade server, tablet device, laptop computer, smartphone, gaming system, entertainment system, storage system, or other computing system, including combinations thereof. When motherboard 310 is installed in a computing system assembly, various assembly elements provide system resources and context for the operation of the integrated circuit device of motherboard 310. As such, the integrated circuit device can comprise one or more integrated circuit elements, such as processor cores, graphics cores, memory cores, communication (I/O) interfaces, and north bridge elements, among other integrated elements.

Voltage domain 320 comprises voltage regulator 321 and decoupling capacitors arranged in several banks, namely banks 322-324, with bank 324 positioned below footprint 311. Voltage domain 330 comprises voltage regulator 331 and decoupling capacitors arranged in several banks, namely banks 332-334, with bank 334 positioned below footprint 311. Voltage domain 340 comprises voltage regulator 341 and decoupling capacitors arranged in several banks, namely banks 342-344, with bank 344 positioned below footprint 311. Voltage domain 350 comprises voltage regulator 351 and decoupling capacitors arranged in several banks, namely banks 352-354, with bank 354 positioned below footprint 311. Each voltage domain might supply a different nominal voltage level or may comprise several instances of the same nominal voltage level for redundancy, current draw capacity, or to provide similar voltages to different cores of an integrated circuit device. The voltages are regulated by the associated voltage regulators, which can be controlled by a power control circuit located on motherboard 310. Each voltage domain also includes the circuit routing, circuit board planes, and power delivery components like power FETs, diodes, or other such devices that form the electrical pathways extending from voltage regulators to the integrated circuit device to connections of footprint 311 for the integrated circuit device. Once the integrated circuit device is populated, the voltage domains also can include packaging/carrier pathways for the integrated circuit device and power distribution elements within the semiconductor and metallization structures of the integrated circuit device itself to delivery power to integrated circuit components.

Decoupling capacitors included in sets 322-324, 332-334, 342-344, and 352-354 comprise surface mount MLCCs in this example. The decoupling capacitors can be of various sizes, such as 0603, 0402, 0201 size surface mount capacitors, among others. Although a representative quantity of capacitors are included in FIG. 3, the capacitor banks can have various quantities of individual capacitors as well as associated locations on motherboard 310. The positioning of the banks typically is fixed during a design phase for motherboard 310, which are defined by solder pads, vias, and traces formed onto associated circuit boards. De-populated capacitors 325 and 326 are shown as one example of circuit board pads able to accept surface mount decoupling capacitors.

Testing system 360 includes test fixture 361 along with test links 362-364. Links 362-364 couple to a testing control system, such as testing system 110 of FIG. 1 or testing control system 500 of FIG. 5. Testing system 360 monitors voltage domain performance under various load profiles and decoupling capacitance populations. Monitoring of the performance of the voltage domains under test can be accomplished via monitoring circuitry, such as operational amplifiers, comparators, or analog-to-digital conversion circuitry, portions of which may be included in test fixture 361. Test fixture 361 conductively couples at least to voltage domains via pads or balls of footprint 311. Connection features can comprise pins or spring-loaded or compliant electrical contact features to conductively contact pads/balls of footprint 311. Various aiming or positioning elements can be included to properly align and make contact with footprint 311.

Figure 4:
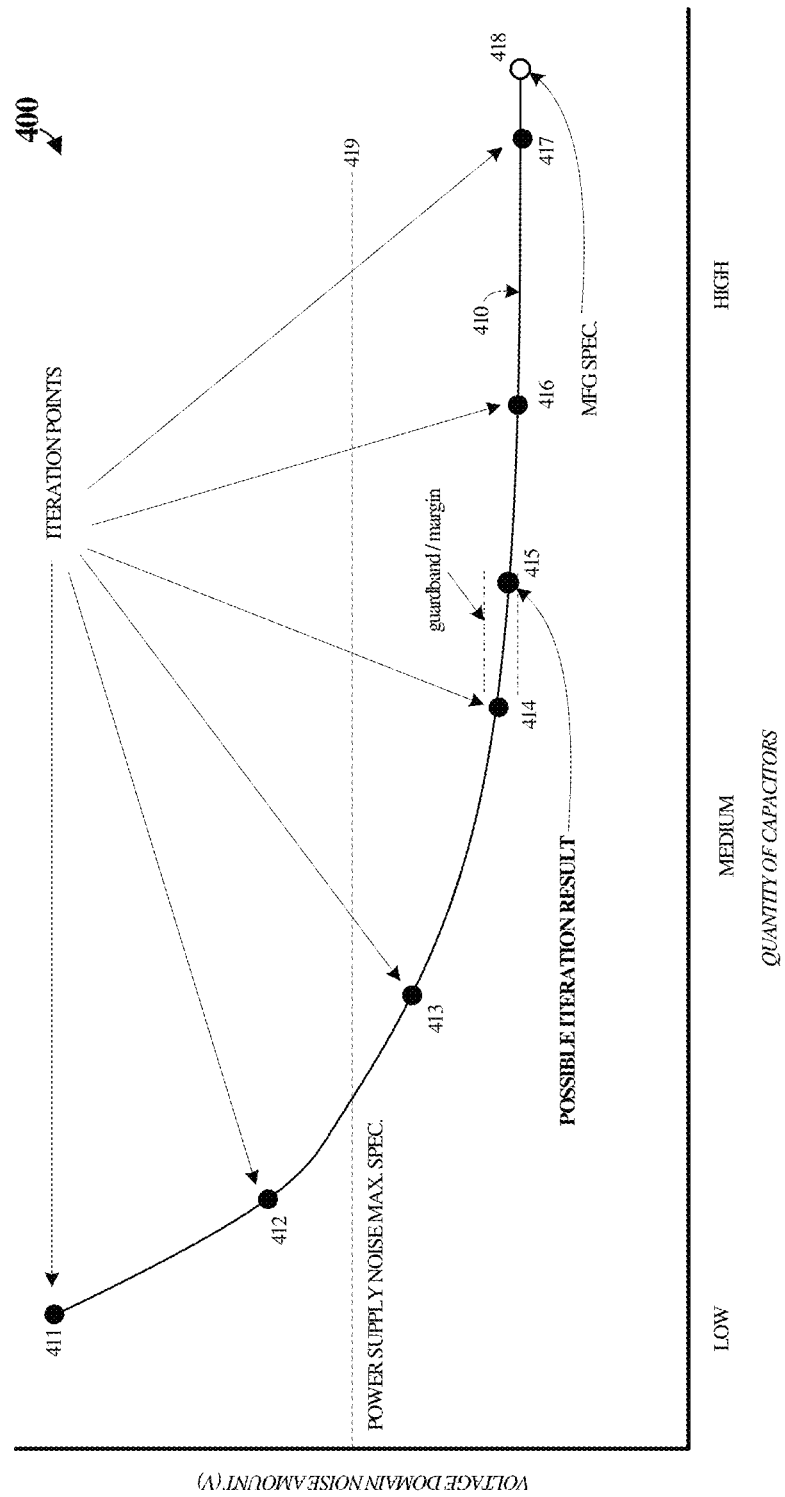
FIG. 4 illustrates example iterative testing operations in an implementation.

Turning to example operations of the elements of FIG. 3, FIG. 4 is presented. FIG. 4 illustrates graph 400 relating to an iterative technique to determine a reduced quantity of decoupling capacitors for a voltage domain of motherboard 310. Graph 400 can be repeated for each voltage domain on motherboard 310. A vertical axis of graph 400 indicates a noise amount in volts for a particular voltage domain, and a horizontal axis of graph 400 indicates a quantity of capacitors in relative terms (e.g. low, medium, high). The exact quantities of capacitors will vary based on implementation. Curve 410 shows discrete iteration points 411-417, each relating to a different iteration of capacitor population for the voltage domain. Thus, curve 410 shows several iterations each having a different corresponding quantity of decoupling capacitors.

An iterative process, as described in FIG. 4, is utilized to characterize performance in terms of 'AC' noise (i.e. voltage ripple, spikes, dips) experienced at footprint 311 from an initial populated quantity of capacitors, through changes in quantity of capacitors (iteration points 411-417) with a concordant change in power supply noise. For a particular motherboard design, a manufacturer recommended quantity of capacitive devices is indicated by quantity 418. During the iterative testing technique applied in FIG. 4, a smaller quantity of decoupling capacitance than specified by a manufacturer specification is determined. Taking an iterative approach that removes capacitors for each iteration, a leftward motion along curve 410 is followed. Each removal of capacitors typically increases the noise experienced by a voltage rail at footprint 311. At some point, a threshold level of noise is exceeded by removal of capacitors for a particular present iteration, and this is shown as threshold 419 indicating a maximum noise specification for the integrated circuit device when coupled to footprint 311. Thus, iterations 411 and 412 would exceed this noise threshold and be unsuitable for a final quantity of decoupling capacitors. Iterations 413 and 414 would be suitable results, being below the noise threshold. However, additional capacitors can be added to ensure that margin is included and that the noise experienced by a particular iteration does not increase or decrease within a certain range. Thus, iteration 415 might indicated a possible result, due in part to the addition of further capacitors not substantially changing the noise level and removal of capacitors beginning to increase a noise level. Thus, iteration 415 has less noise than threshold 419, includes margin, and can be selected for the final manufacturing solution. And as discussed earlier, the final manufacturing solution would in part be selected to not substantially impact the operational voltage minimum required to sustain correct operation of the integrated circuit device when supply voltage reduction techniques are being applied.

Although many computing systems would show benefits of such a technique for capacitor component reductions, it should also be noted that computing systems designed with an inadequate amount of decoupling capacitance would also benefit from such a technique to determine that additional capacitance is required to meet system or component supply voltage noise requirements.

Figure 5:
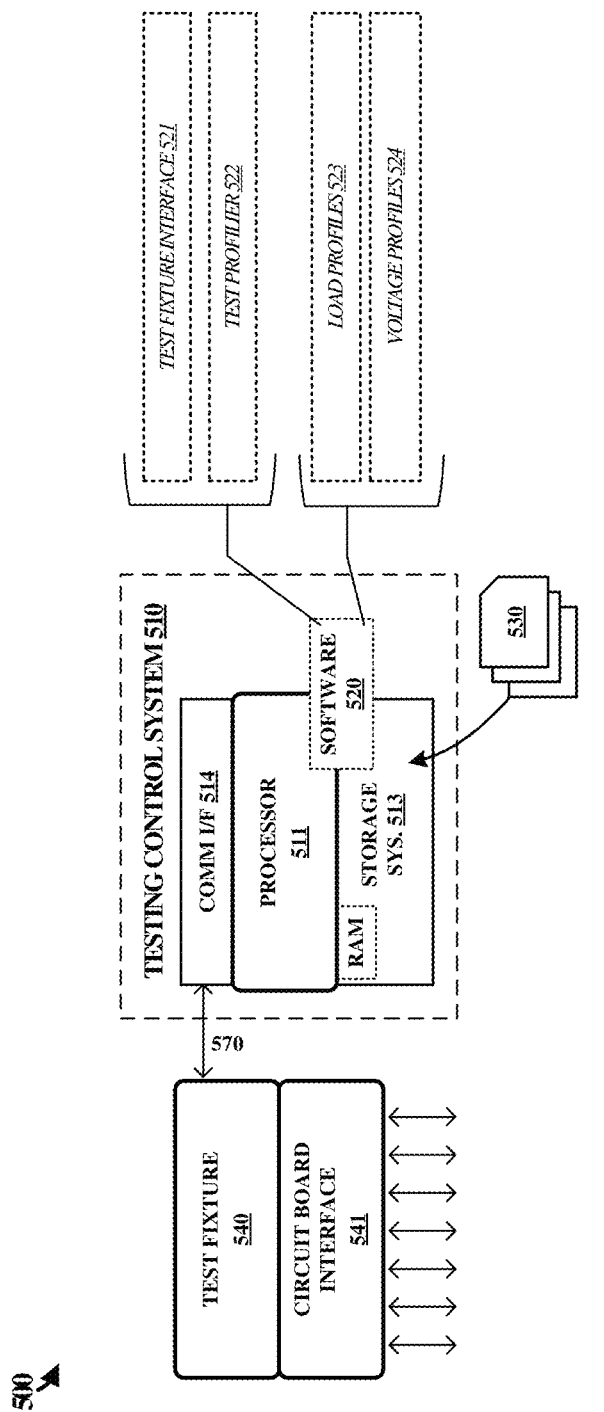
FIG. 5 illustrates an example testing control system in an implementation.

FIG. 5 illustrates testing control system 510 that is representative of any system or collection of systems from which the various performance testing, decoupling capacitor population iteration control, load profile excitation, noise characterization, and voltage control operations can be directed. Any of the control of testing or characterization employed in the operational architectures, platforms, scenarios, and processes disclosed herein may be implemented using elements of testing control system 510. In one implementation, testing control system 510 is representative of at least a portion of testing system 110 of FIG. 1 or testing system 360 of FIG. 3. Testing control system 510 might also include elements of an external system, such as a manufacturing system communicatively coupled to a motherboard or circuit board.

Testing control system 510 may be implemented as a single apparatus, system, or device or may be implemented in a distributed manner as multiple apparatuses, systems, or devices. Testing control system 510 includes, but is not limited to, processor 511, storage system 513, communication interface system 514, and software 520. FIG. 5 also shows test fixture 540 and circuit board interface 541. Test fixture 540 is communicatively coupled to communication interface 514 over link 570.

Processor 511 is operatively coupled with storage system 513 and communication interface system 514. Processor 511 loads and executes software 520 from storage system 513. Software 520 includes executable instructions representative of the processes discussed with respect to the included Figures and operations. When executed by processor 511 to enhance decoupling capacitor population adjustments for target integrated circuit devices, software 520 directs processor 511 to operate as described herein for at least the various processes, operational scenarios, and sequences discussed in the foregoing implementations. Testing control system 510 may optionally include additional devices, features, or functionality not discussed for purposes of brevity.

Processor 511 may comprise a microprocessor and processing circuitry that retrieves and executes software 520 from storage system 513. Processor 511 may be implemented within a single processing device, but may also be distributed across multiple processing devices, sub-systems, or specialized circuitry, that cooperate in executing program instructions and in performing the operations discussed herein. Examples of processor 511 include general purpose central processing units, application specific processors, and logic devices, as well as any other type of processing device, combinations, or variations thereof.

Storage system 513 may comprise any computer readable storage media readable by processor 511 and capable of storing software 520. Storage system 513 may include volatile and nonvolatile, removable and non-removable media implemented in any method or technology for storage of information, such as computer readable instructions, data structures, program modules, or other data. Examples of storage media include random access memory (RAM), read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 513 may also include computer readable communication media over which at least some of software 520 may be communicated internally or externally. Storage system 513 may be implemented as a single storage device, but may also be implemented across multiple storage devices or sub-systems co-located or distributed relative to each other. Storage system 513 may comprise additional elements, such as a controller, capable of communicating with processor 511 or possibly other systems.

Software 520 may be implemented in program instructions and among other functions may, when executed by processor 511, direct processor 511 to operate as described with respect to the various operational scenarios, sequences, and processes illustrated herein. For example, software 520 may include program instructions for enhanced decoupling capacitor population adjustments for target integrated circuit devices, among other operations. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 520 may include additional processes, programs, or components, such as operating system software or other application software, in addition to that of modules 521-524. Software 520 may also comprise program code, scripts, macros, and other similar components. Software 520 may also comprise software or some other form of machine-readable processing instructions executable by processor 511. In general, software 520 may, when loaded into processor 511 and executed, transform a suitable apparatus, system, or device (of which testing control system 510 is representative) overall from a general-purpose computing system into a special-purpose computing system customized to facilitate enhanced decoupling capacitor population adjustments for target integrated circuit devices.

Encoding software 520 on storage system 513 may transform the physical structure of storage system 513. The specific transformation of the physical structure may depend on various factors in different implementations of this description. Examples of such factors may include, but are not limited to, the technology used to implement the storage media of storage system 513 and whether the computer-storage media are characterized as primary or secondary storage, as well as other factors. For example, if the computer readable storage media are implemented as semiconductor-based memory, software 520 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Modules 521-524 can include one or more software elements and associated data structures, such as an operating system, devices drivers, and one or more applications. These elements can describe various portions of testing control system 510 with which test fixture 540, or other elements interact. For example, an operating system can provide a software platform on which modules 521-524 are executed and allows for enhanced decoupling capacitor population adjustments for target integrated circuit devices, among other operations.

Test fixture interface 521 communicates over communication interface 514 with test fixture 540. Test fixture interface 521 can provide various APIs, protocols, data structures, or other digital interfacing to allow test fixture 540 to report results to test profiler 522, and to receive instructions from test profiler 522 to control operation of test fixture 540.

Test profiler 522 applies load profiles to systems under test via test fixture 540. The load profiles applied by test profiler 522 can include both $\Delta i/\Delta t$ events (AC) and steady-state loading conditions (DC) applied to voltage rails of a system under test via corresponding connections made by test fixture 540. The load profiles can be defined by waveforms or electrical current loading definitions that define a frequency of load events and duty cycle of the loading events and waveforms. Various $\Delta i/\Delta t$ events can be produced using a load generation device, which can comprise a load slammer or similar element, that produces variable loads or loads simulating transistor devices switching at a particular frequency or set of frequencies. The load profiles can incorporate various inductive or capacitive loading to simulate metallization or interconnect of the integrated circuit device along with capacitive properties of the transistors themselves. Load currents applied to the connections of an integrated circuit device footprint can encompass absolute maximum currents, electrical design currents (transitory), and thermal design currents (steady state). Load profiles can further encompass transient loads to induce spikes, dips or other transient events on power rails. Loads can be selectively applied or altered in magnitude to simulate dynamic loads, noise signals, or composite load signals simulating operation of an integrated circuit device. Load profiles can be configured to simulate coupling of noise form data/control/clock signals onto power rails. In some examples, the performance test for a target integrated circuit device comprises iteratively applying one or more load profiles to a circuit board that is intended to house an integrated circuit device. Various iterations of decoupling capacitor populations are attempted during application of the load profile.

Load profiles 523 comprise one or more data structures that indicate load profiles to be applied to systems under test. These data structures can include representations or indications of $\Delta i/\Delta t$ events, waveform representations, or other properties that inform load profiler 522 on which loading conditions to apply. Load profiles 523 can also include indications of performance thresholds or noise thresholds that need to be met for a quantity of decoupling capacitors to be satisfactory. Load profiles 523 can also include various indications of margins, EOL margins, guardbands, and other information which might provide adjustments to results from load profiler 522. Load profiles 523 can also include binning information related to which load profiles should be applied to each bin category.

Voltage profiles 524 can optionally indicate voltage levels that are to be used for systems under test, and can be used to instruct voltage regulators on the system under test to adjust voltage levels accordingly. These voltage levels might be manufacturer-supplied levels, nominal levels, or reduced voltage levels discovered by an iterative performance testing process to determine the lowest operational voltage for a particular integrated circuit device. Control of the voltage regulators according to the voltage levels can occur over various communication or control interfaces provided by communication interface 514, such as SMB or I2C interfaces.

Load profiles, iteration properties, capacitor population properties, or other various support data and inputs used to perform the operations of testing control system can be included within storage system 513, as indicated by data structures 530. Control over the operations of test profiler 522 and changes to load profiles 523 and voltage profiles 524 can also occur via modification or alteration of values stored within data structures 530. Reads/writes of data structures 530 can occur over communication interface 514 from one or more external systems, which may include user systems, servers, manufacturing test systems, testbench systems, control nodes, or remote terminal nodes, among other external systems. Various other data included in data structures 530 might include load profile testing initiation control registers, performance testing status registers, manual setting of operating voltage levels or minimum/maximum voltage levels, as well as various identification information comprising serial numbers, model numbers, version numbers, and related information for both hardware and software elements.

Communication interface system 514 may include communication connections and devices that allow for communication over link 570 to communicate with a target circuit board via test fixture 540 and circuit board interface 541 as well as optionally with control electronics, voltage control systems, voltage adjustment circuitry, voltage adjustment units, power regulator circuitry, voltage control circuitry, power supply circuitry, or with external systems (not shown in FIG. 5) over one or more communication networks (not shown). Examples of connections and devices that together allow for inter-system communication may include discrete control links, system management buses, serial control interfaces, register programming interfaces, network interface cards, antennas, power amplifiers, RF circuitry, transceivers, and other communication circuitry. The connections and devices may communicate over communication media to exchange packetized communications with other computing systems or networks of systems, such as metal, glass, air, or any other suitable communication media. Communication interface system 514 may include user interface elements, such as programming registers, control/status registers, APIs, or other user-facing control and status elements.

Communication between testing control system 510 and test fixture 540 may occur over link 570 comprising a communicate link or a communication network or networks, and in accordance with various communication protocols, combinations of protocols, or variations thereof. These other systems can include target integrated circuit devices, voltage control systems, or manufacturing systems, among others. Communication interfaces might comprise system management bus (SMB) interfaces, inter-integrated circuit (I2C) interfaces, or other similar interfaces. Further examples include intranets, internets, the Internet, local area networks, wide area networks, wireless networks, wired networks, virtual networks, software defined networks, data center buses, computing backplanes, or any other type of network, combination of network, or variation thereof. Some example communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Test fixture 540 along with circuit board interface 541 comprises a testing interface, testing monitoring system, and load profile excitation system. While test profiler 522 and test fixture interface 521 can provide similar features, test fixture 540 operates at the physical layer to actually perform the load profile excitation for a system under test. Test fixture 540 can monitors voltage domain performance under various load profiles and decoupling capacitance populations. Test fixture 540 includes one or more communication interfaces to report results to testing control system 510 over link 570. Monitoring of the performance of the voltage domains under test can be accomplished via included monitoring circuitry, such as operational amplifiers, comparators, or analog-to-digital conversion circuitry, portions of which may be included in test fixture 540. A digital representation of the monitored performance can be provided to testing control system 510 when converted from an analog format into a digital format by test fixture 540.

Test fixture 540 conductively couples to voltage domains via pads or balls on a motherboard or system assembly via circuit board interface 541. This conductively coupling can also include coupling to data, clock, control, or I/O connections if desired. Circuit board interface 541 can include connection features can comprise pins or spring-loaded or compliant electrical contact features to conductively contact pads/balls of an integrated circuit device footprint. Various aiming or positioning elements can be included in circuit board interface 541 to properly align and make contact with a footprint. Circuit board interface 541 includes various communication and power links to test fixture 540, and can have local circuitry to simulate loads according to the load profiles or modulate loads according to the load profiles. Test fixture 540 may include heat dissipation elements or environmental simulation elements, such as housings, cabinets, or solid-state temperature regulation devices to increase or decrease an environmental condition or operating temperature. Test fixture 540 may include digital-to-analog conversion circuitry to convert commands/load profiles received from testing control system 510 in a digital representation into analog representation for application to a circuit board via circuit board interface 541.

Figure 6:
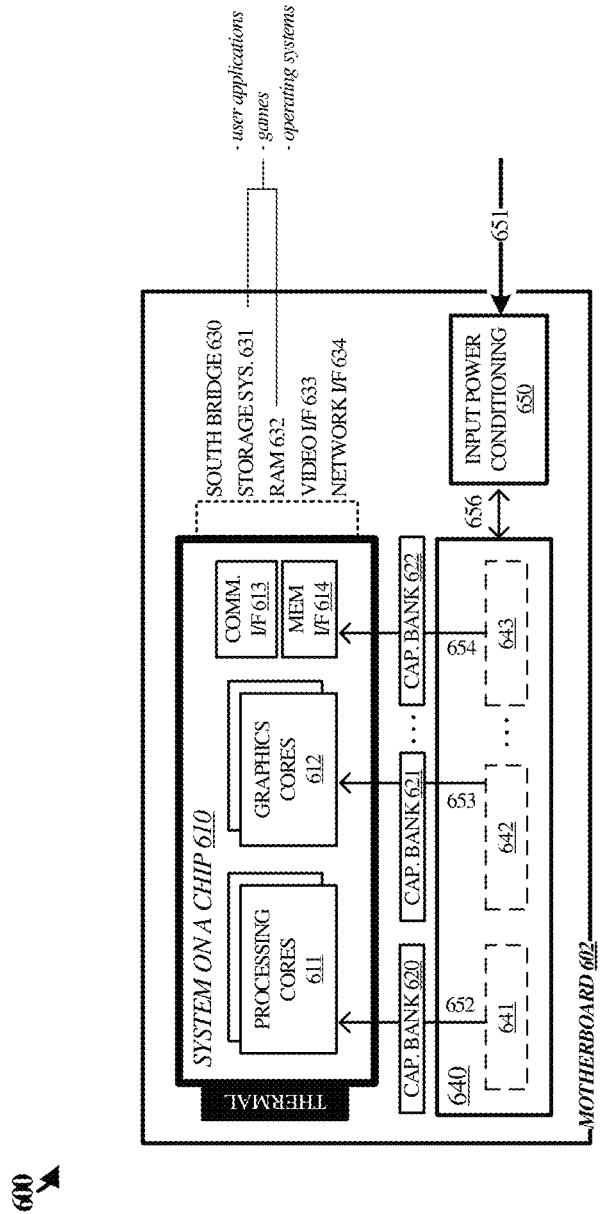
FIG. 6 illustrates an example computing system in an implementation.

As an example an integrated circuit device and associated motherboard and contextual elements, FIG. 6 is presented. FIG. 6 illustrates computing system 600 that is representative of any system or collection of systems in which the various circuit board based operational architectures, platforms, scenarios, and processes disclosed herein may be implemented. For example, computing system 600 can be used to implement any of the circuit boards under test or the integrated circuit devices discussed herein, such as system assembly 120 and integrated circuit device 140 of FIG. 1, or motherboard 310 of FIG. 3, among others.

Examples of computing system 600 include, but are not limited to, a gaming console, smartphone, tablet computer, laptop, server, personal communication device, personal assistance device, wireless communication device, subscriber equipment, customer equipment, access terminal, telephone, mobile wireless telephone, personal digital assistant, personal computer, e-book, mobile Internet appliance, wireless network interface card, media player, or some other computing apparatus, including combinations thereof.

Computing system 600 may be implemented as a single apparatus, system, or device or may be implemented in a distributed manner as multiple apparatuses, systems, or devices. Computing system 600 includes, but is not limited to, motherboard 602, system on a chip (SoC) device 610, and power system 640, and input power conditioning portion 650. Various contextual or peripheral elements can be included in computing system 600, such as mounted to motherboard 602 or included on separate circuit boards. These elements include south bridge 630, storage system 631, random-access memory (RAM) 632, video interfaces 633, and network interfaces 634. Furthermore, input power conditioning circuitry 650 and optional thermal management elements can be included. SoC device 610 can be optionally mounted to a carrier circuit board or package assembly mounted to motherboard 602.

SoC device 610 may comprise a micro-processor and processing circuitry that retrieves and executes software from storage system 631 and RAM 632. Software can include various operating systems, user applications, gaming applications, multimedia applications, or other user applications. SoC device 610 may be implemented within a single processing device, but may also be distributed across multiple processing devices or sub-systems that cooperate in executing program instructions. Examples of SoC device 610 include general purpose central processing units, application specific processors, graphics processing units, and logic devices, as well as any other type of processing device, combinations, or variations thereof. In FIG. 6, SoC device 610 includes processing cores 611, graphics cores 612, communication interfaces 613, memory interfaces 614, among other elements. Some of the noted elements of SoC device 610 can be included in a north bridge portion of SoC device 610. SoC device 610 is operatively coupled with other elements in computing system 600 external to SoC device 610, such as south bridge 630, storage system 631, RAM 632, video interfaces 633, and network interfaces 634.

Data storage elements of computing system 600 include storage system 631 and RAM 632. Storage system 631 and RAM 632 may comprise any computer readable storage media readable by SoC device 610 and capable of storing software. Storage system 631 and RAM 632 may include volatile and nonvolatile, removable and non-removable media implemented in any method or technology for storage of information, such as computer readable instructions, data structures, program modules, or other data. Examples of storage media include dynamic random access memory (DRAM), static random access memory (SRAM), read only memory, magnetic disks, optical disks, flash memory, virtual memory and non-virtual memory, magnetic disk storage or other magnetic storage devices, or any other suitable storage media. Storage system 631 may comprise additional elements, such as a controller, capable of communicating with SoC device 610 or possibly other systems.

South bridge 630 includes interfacing and communication elements which can provide for coupling of SoC device 610 to peripherals, user input devices, user interface devices, printers, microphones, speakers, or other external devices and elements. In some examples, south bridge 630 includes a system management bus (SMB) controller or other system management controller elements.

Video interfaces 633 comprise various hardware and software elements for outputting digital images, video data, audio data, or other graphical and multimedia data which can be used to render images on a display, touchscreen, or other output devices. Digital conversion equipment, filtering circuitry, image or audio processing elements, or other equipment can be included in video interfaces 633.

Network interfaces 634 can provide communication between computing system 600 and other computing systems (not shown), which may occur over a communication network or networks and in accordance with various communication protocols, combinations of protocols, or variations thereof. Example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Computing system 600 can also comprise one or more enclosures that can include various structural support elements, cases, chassis elements, or other elements that house and structurally support the further elements of computing system 600. Optional thermal management elements can include heatsinks, fans, heat pipes, heat pumps, refrigeration elements, or other elements to manage and control temperature of an optional enclosure and computing system 600. Typically, thermal management elements are included for SoC device 610 or associated circuitry, along with thermal monitoring elements.

Input power conditioning 650 can include filtering, surge protection, electromagnetic interference (EMI) protection and filtering, as well as perform other input power functions for input power 651. In some examples, input power conditioning 650 includes AC-DC conversion circuitry, such as transformers, rectifiers, power factor correction circuitry, or switching converters. When a battery source is employed as input power 651, then input power conditioning 650 can include various diode protection, DC-DC conversion circuitry, or battery charging and monitoring circuitry. Some of the elements of power system 640 might be included in input power conditioning 650.

As mentioned above, SoC device 610 includes many different internal elements and structures, such as processing cores 611, graphics cores 612, communication interfaces 613, and memory interfaces 614. However, each of these internal elements might be associated with a separate or dedicated voltage domain, or one or more of these internal elements might be serviced by multiple voltage domains. A voltage domain can comprise a set of power links, planes, distribution structures, or interconnect which is independent within SoC device 610 from other voltage domains. Power distribution structures of each voltage domain can receive input voltages having different voltage levels, which may be independently varied. For example, processing cores 611 might all prefer a nominal input voltage level ($V_{DD}$) of 1.00 VDC, but variations in this nominal input voltage level can be determined based on performance testing executed for SoC device 610. In such examples, individual processing cores 611 might be able to be operated at exemplary voltage levels such as 0.950 VDC, 0.925 VDC, or 0.900 VDC, among others. Other voltage domains can have other voltage levels determined below manufacturer specified values.

Power system 640 includes a plurality of voltage regulator units 641-643. Power system 640 receives supply power over link 656 from input power conditioning circuitry 650. Link 656 can represent more than one voltage link or power link. Internal power distribution links can deliver power received via power link 656 to individual voltage regulator units 641-643. Voltage regulator units 641-643 individually alter voltage levels to produce input power for delivery to individual voltage domains of SoC device 610. SoC device 610 receives power over input power links 652-654 as supplied by the plurality of voltage regulator units 641-643. Power links 652-654 can also be referred to as power domains, power rails, voltage rails, or power planes.

Voltage regulator units 641-643 can provide supply voltages at associated current levels to SoC device 610. In many examples, voltage adjustment units can convert or alter a supply voltage of link 656 to a different output voltage on associated links 652-654, along with any related voltage regulation. Voltage regulator units 641-643 might receive supply power over link 656 at a first voltage level and convert this first voltage level into second voltage levels. These second voltage levels can be different among each of voltage regulator units 641-643, and each can correspond to a different voltage domain of SoC 630. Voltage regulator units 641-643 comprise various power electronics, power controllers, DC-DC conversion circuitry, power transistor gate modulation circuitry, power transistors, half-bridge elements, filters, passive components, and other elements to convert supply power received over link 656 into input power usable by SoC device 610.

A bank of capacitors is included for each voltage domain of SoC device 610. These banks are shown in FIG. 6 as capacitor banks 620-622. Each of capacitor banks 620-622 includes a plurality of individual or discrete capacitors coupled to motherboard 602 or package assembly elements associated with SoC 610. Capacitor banks 620-622 can be examples of decoupling capacitors 130-132 of FIG. 1 or any of the decoupling capacitors of voltage domains 320, 330, 340, and 350 of FIG. 3. Individual capacitors of capacitor banks 620-622 are coupled between the associated voltage link and a reference potential for that voltage link. In operation, individual capacitors among capacitor banks 620-622 are selectively depopulated to optimize a quantity of capacitors for a given load profile or threshold noise level associated with voltage domains of SoC 610.

Certain inventive aspects may be appreciated from the foregoing disclosure, of which the following are various examples.

Example 1: A method, comprising iterating application of a load profile across different populations of decoupling capacitors on a circuit board for supply voltage domains of an integrated circuit device until a target transient performance is reached for the supply voltage domains, wherein the load profile is applied onto electrical connections corresponding to the supply voltage domains for the integrated circuit device. The method also includes generating a capacitor population configuration for the circuit board based on a population of the decoupling capacitors that achieves the target transient performance.

Example 2: The method of Example 1, further comprising, for each iteration, determining if margin exists in the transient performance to support removal of one or more decoupling capacitors and employing a population configuration comprising removal of the one or more capacitors during a subsequent iteration.

Example 3: The method of Examples 1-2, further comprising selecting the one or more decoupling capacitors as being electrically furthest from the electrical connections among a present population of decoupling capacitors.

Example 4: The method of Examples 1-3, wherein determining if the margin exists in the transient performance comprises comparing the transient performance to a target specification of margin for transient performance of the integrated circuit device.

Example 5: The method of Examples 1-4, wherein the target specification of margin comprises a manufacturer supplied margin for the integrated circuit device with an end-of-life guardband applied to the manufacturer supplied margin.

Example 6: The method of Examples 1-5, further comprising controlling assembly of capacitors onto a target circuit board in accordance with the capacitor population configuration.

Example 7: The method of Examples 1-6, further comprising operating the target circuit board having a corresponding integrated circuit device populated thereon, monitoring transient performance for the supply voltage domains during operation of the corresponding integrated circuit device, and verifying the transient performance for the supply voltage domains is in accordance with the target transient performance.

Example 8: The method of Examples 1-7, wherein the target transient performance comprises performance of voltage transient levels monitored for the supply voltage domains during application of the load profile.

Example 9: The method of Examples 1-8, wherein the electrical connections comprise a footprint for the integrated circuit device on the circuit board, and wherein the load profile is applied onto the footprint while the integrated circuit device is not populated onto the circuit board.

Example 10: The method of Examples 1-9, wherein the electrical connections comprise a footprint for a carrier assembly for a semiconductor die comprising the integrated circuit device, wherein the carrier assembly is attached to the circuit board without the semiconductor die coupled thereto, and wherein the load profile is applied to electrical connections on the carrier assembly for the semiconductor die.

Example 11: The method of Examples 1-10, wherein the load profile is based in part on reduced operating voltages for the supply voltage domains determined from executing a performance test on a representative integrated circuit device to determine the reduced operating voltages as lower than a manufacturer specified voltage level for the supply voltage domains.

Example 12: An apparatus, comprising one or more computer readable storage media and program instructions stored on the one or more computer readable storage media. The program instructions are executable by a processing system to direct the processing system to at least iterate application of a load profile across different populations of decoupling capacitors on a circuit board for supply voltage domains of an integrated circuit device until a target transient performance is reached for the supply voltage domains, wherein the load profile is applied onto electrical connections corresponding to the supply voltage domains for the integrated circuit device. The program instructions further direct the processing system to generate a capacitor population configuration for the circuit board based on a population of the decoupling capacitors that achieves the target transient performance.

Example 13: The apparatus of Example 12, comprising further instructions executable by the processing system to direct the processing system to at least, for each iteration, determine if margin exists in the transient performance to support removal of one or more decoupling capacitors and produce a population configuration comprising removal of the one or more capacitors during a subsequent iteration.

Example 14: The apparatus of Examples 12-13, comprising further instructions executable by the processing system to direct the processing system to at least select the one or more decoupling capacitors as being electrically furthest from the electrical connections among a present population of decoupling capacitors.

Example 15: The apparatus of Examples 12-14, comprising further instructions executable by the processing system to direct the processing system to at least determine if the margin exists in the transient performance by at least comparing the transient performance to a target specification of margin for transient performance of the integrated circuit device.

Example 16: The apparatus of Examples 12-15, wherein the target specification of margin comprises a manufacturer supplied margin for the integrated circuit device with an end-of-life guardband applied to the manufacturer supplied margin.

Example 17: The apparatus of Examples 12-16, comprising further instructions executable by the processing system to direct the processing system to at least control assembly of capacitors onto a target circuit board in accordance with the capacitor population configuration.

Example 18: The apparatus of Examples 17, comprising further instructions executable by the processing system to direct the processing system to at least operate the target circuit board having a corresponding integrated circuit device populated thereon, monitor transient performance for the supply voltage domains during operation of the corresponding integrated circuit device, and verify the transient performance for the supply voltage domains is in accordance with the target transient performance.

Example 19: A control system, comprising a test interface and a test profiler. Across an iteratively reduced population of decoupling capacitors, the test interface is configured to instruct a text fixture to apply a load profile onto electrical connections of a circuit board corresponding to supply voltage domains for an integrated circuit device. The test profiler is configured to monitor transient performance of the supply voltage domains and determine when a target transient performance is reached for the supply voltage domains. The test profiler is configured to generate a capacitor population configuration for the circuit board based on a population of the decoupling capacitors that achieves the target transient performance.

Example 20: The control system of Example 19, comprising the test profiler configured to select one or more decoupling capacitors for removal before performance of a subsequent iteration, and the test profiler configured to transfer an indication of the selection of the one or more decoupling capacitors, wherein the one or more capacitors are selected as being electrically furthest from the electrical connections among a present population of decoupling capacitors.

The functional block diagrams, operational scenarios and sequences, and flow diagrams provided in the Figures are representative of exemplary systems, environments, and methodologies for performing novel aspects of the disclosure. The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method, comprising:
   iterating application of a load profile across different populations of decoupling capacitors on a circuit board for supply voltage domains of an integrated circuit device until a target transient performance is reached for the supply voltage domains, wherein the load profile is applied onto electrical connections corresponding to the supply voltage domains for a footprint of the integrated circuit device while the integrated circuit device is not populated onto the circuit board; and
   generating a capacitor population configuration for the circuit board based on a population of the decoupling capacitors that achieves the target transient performance.

2. The method of claim 1, further comprising:
   for each iteration, determining if margin exists in the transient performance to support removal of one or more decoupling capacitors and employing a population configuration comprising removal of the one or more capacitors during a subsequent iteration.

3. The method of claim 2, further comprising:
   selecting the one or more decoupling capacitors as being electrically furthest from the electrical connections among a present population of decoupling capacitors.

4. The method of claim 2, wherein determining if the margin exists in the transient performance comprises comparing the transient performance to a target specification of margin for transient performance of the integrated circuit device.

5. The method of claim 4, wherein the target specification of margin comprises a manufacturer supplied margin for the integrated circuit device with an end-of-life guardband applied to the manufacturer supplied margin.

6. The method of claim 1, further comprising:
   controlling assembly of capacitors onto a target circuit board in accordance with the capacitor population configuration.

7. The method of claim 6, further comprising:
   operating the target circuit board having a corresponding integrated circuit device populated thereon;
   monitoring transient performance for the supply voltage domains during operation of the corresponding integrated circuit device;
   verifying the transient performance for the supply voltage domains is in accordance with the target transient performance.

8. The method of claim 1, wherein the target transient performance comprises performance of voltage transient levels monitored for the supply voltage domains during application of the load profile.

9. The method of claim 1, wherein the footprint is for a carrier assembly for a semiconductor die comprising the integrated circuit device;
   wherein the carrier assembly is attached to the circuit board without the semiconductor die coupled thereto; and
   wherein the load profile is applied to electrical connections on the carrier assembly for the semiconductor die.

10. The method of claim 1, wherein the load profile is based in part on reduced operating voltages for the supply voltage domains determined from executing a performance test on a representative integrated circuit device to determine the reduced operating voltages as lower than a manufacturer specified voltage level for the supply voltage domains.

11. An apparatus, comprising:
    one or more computer readable storage media;
    program instructions stored on the one or more computer readable storage media, the program instructions executable by a processing system to direct the processing system to at least:
    iterate application of a load profile across different populations of decoupling capacitors on a circuit board for supply voltage domains of an integrated circuit device until a target transient performance is reached for the supply voltage domains, wherein the load profile is applied onto electrical connections corresponding to the supply voltage domains for a footprint of the integrated circuit device while the integrated circuit device is not populated onto the circuit board; and
    generate a capacitor population configuration for the circuit board based on a population of the decoupling capacitors that achieves the target transient performance.

12. The apparatus of claim 11, comprising further instructions executable by the processing system to direct the processing system to at least:

for each iteration, determine if margin exists in the transient performance to support removal of one or more decoupling capacitors and produce a population configuration comprising removal of the one or more capacitors during a subsequent iteration.

13. The apparatus of claim 12, comprising further instructions executable by the processing system to direct the processing system to at least:

select the one or more decoupling capacitors as being electrically furthest from the electrical connections among a present population of decoupling capacitors.

14. The apparatus of claim 12, comprising further instructions executable by the processing system to direct the processing system to at least:

determine if the margin exists in the transient performance by at least comparing the transient performance to a target specification of margin for transient performance of the integrated circuit device.

15. The apparatus of claim 14, wherein the target specification of margin comprises a manufacturer supplied margin for the integrated circuit device with an end-of-life guardband applied to the manufacturer supplied margin.

16. The apparatus of claim 11, comprising further instructions executable by the processing system to direct the processing system to at least:

control assembly of capacitors onto a target circuit board in accordance with the capacitor population configuration.

17. The apparatus of claim 16, comprising further instructions executable by the processing system to direct the processing system to at least:

operate the target circuit board having a corresponding integrated circuit device populated thereon;

monitor transient performance for the supply voltage domains during operation of the corresponding integrated circuit device;

verify the transient performance for the supply voltage domains is in accordance with the target transient performance.

18. A control system, comprising:

across an iteratively reduced population of decoupling capacitors, a test interface configured to instruct a test fixture to apply a load profile onto electrical connections of a circuit board corresponding to supply voltage domains for a footprint of an integrated circuit device while the integrated circuit device is not populated onto the circuit board;

a test profiler configured to monitor transient performance of the supply voltage domains and determine when a target transient performance is reached for the supply voltage domains;

the test profiler configured to generate a capacitor population configuration for the circuit board based on a population of the decoupling capacitors that achieves the target transient performance.

19. The control system of claim 18, comprising:

the test profiler configured to select one or more decoupling capacitors for removal before performance of a subsequent iteration; and the test profiler configured to transfer an indication of the selection of the one or more decoupling capacitors;

wherein the one or more capacitors are selected as being electrically furthest from the electrical connections among a present population of decoupling capacitors.

* * * * *